United States Patent [19]

Curran

[11] 4,390,877

[45] Jun. 28, 1983

[54] REMOTE CONTROL SYSTEMS FOR TOY VEHICLES, AND THE LIKE

[76] Inventor: Kenneth J. Curran, 2080 Shady Brook Ct., Thousand Oaks, Calif. 91362

[21] Appl. No.: 174,037

[22] Filed: Jul. 31, 1980

[51] Int. Cl.³ .................... H04B 7/00; A63H 30/04; G06F 3/02

[52] U.S. Cl. ............................. 340/825.72; 340/709; 340/355; 340/825.76; 340/825.56; 46/251; 46/255; 200/6 A; 74/471 XY

[58] Field of Search ............. 340/696, 825.72, 825.76, 340/825.63, 825.56, 825.69, 709, 710, 347 M, 347 AD, 348, 349, 355; 46/251, 253, 254, 255, 257, 262, 260, 261, 252; 273/86 R, 86 B; 74/471 R, 471 XY, 504, 495; 328/68, 128, 67; 200/6 A

[56] References Cited

U.S. PATENT DOCUMENTS

| | | | |
|---|---|---|---|
| 3,400,488 | 9/1968 | Phillpott et al. | 46/255 |
| 3,705,387 | 12/1972 | Stern et al. | 273/86 B |
| 4,156,130 | 5/1979 | Ivashin et al. | 338/128 |
| 4,161,726 | 7/1979 | Burson et al. | 340/365 R |
| 4,200,867 | 4/1980 | Hill | 340/709 |

Primary Examiner—Donnie L. Crosland

Attorney, Agent, or Firm—Keith D. Beecher

[57] ABSTRACT

A remote control system in which control signals from a transmitter are sent to receivers mounted in a number of cars, or other vehicles. Manually operated controllers for the respective vehicles are connected to the transmitter. The transmitter is capacitively coupled to the receivers, and there is no conversion of the control signals into modulated radio frequency carriers in the embodiment to be described. The track on which the cars are propelled is coated with a conductive material which forms one plate of a capacitor, the other plate being formed by a second conductor which extends around the track and which is spaced and insulated from the conductive coating. Under some circumstances, the second conductor may be ground. Each car forms two additional capacitor plates within the first capacitor to provide capacitive coupling between the transmitter and the cars. The data transmission system at the transmitter uses a type of pulse code which permits the individual cars to be controlled by their individual controllers independently of one another, and which enables various commands to be transmitted to the individual cars so that each car may be steered, and so that the speed of each car may be controlled.

9 Claims, 11 Drawing Figures

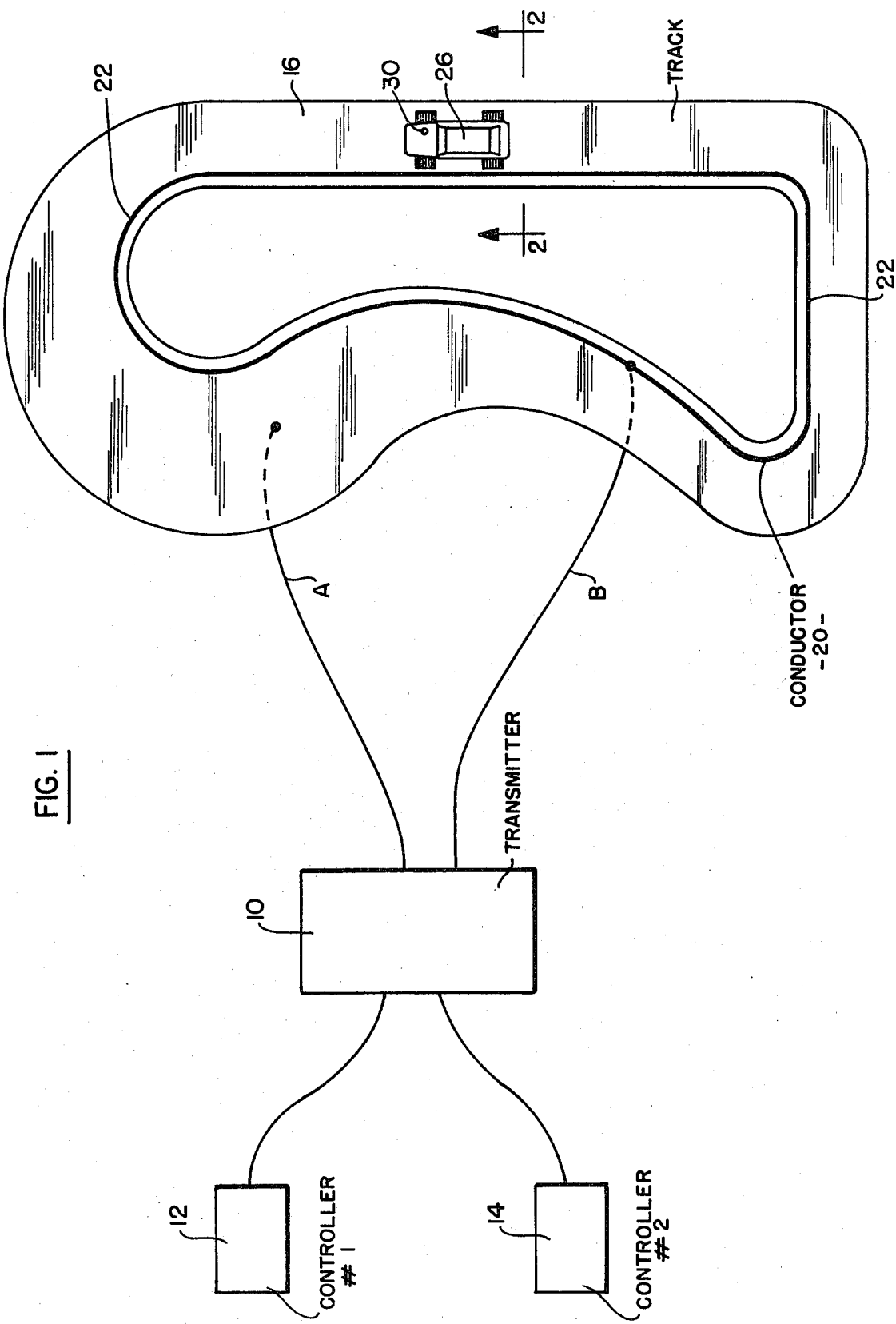

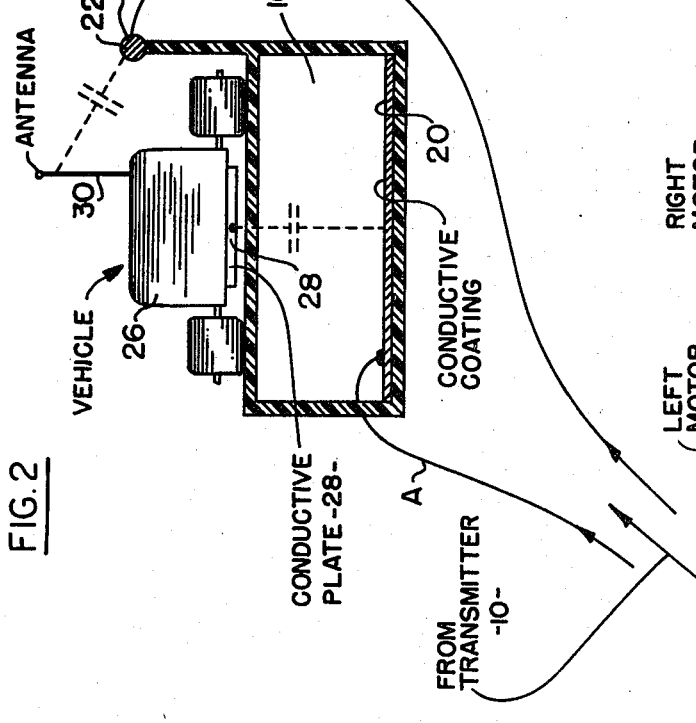

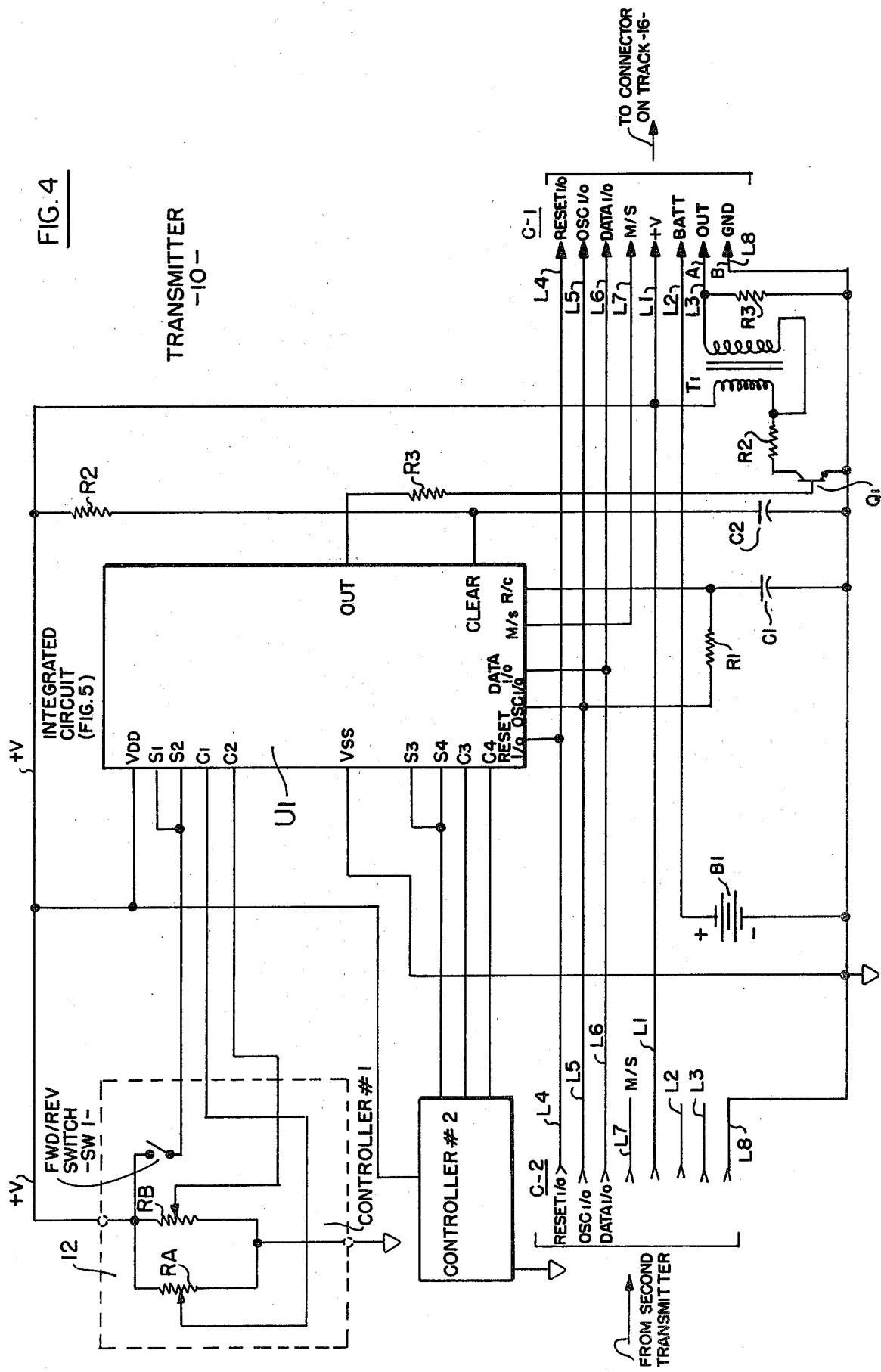

REMOTE CONTROL SYSTEMS FOR TOY VEHICLES, AND THE LIKE

BACKGROUND

Electrically energized toy racing cars are known which may be raced against one another. It is usual in the prior art to provide a track with side walls, or slots, and for the cars to be controlled so that they are directed along the slots, or so that they may be steered to be biased against one or the other of the side walls. In each case, electrical energy is usually applied to the prior art racing cars through which electrically conductive strips extending along the track. Such an arrangement, however, has limitations, since it is essential that the cars be maintained in electrical contact with their electrically conductive energizing strips.

Copending Application Ser. No. 136,259 filed in the name of Richard L. May on July 31, 1980 (now abandoned) describes an electrically energized toy racing car which uses two separate motors to drive the two front wheels of the car so as to enable the car to be steered by independently varying the speeds of the two motors, and to be driven at various speeds, by concurrently varying the speeds of the two motors. An objective of the present invention is to provide a remote control system for a toy racing car of the type discussed in the copending application, and which does not require electrically energized strips, so that each car may be steered and driven along the track at different controlled speeds without the necessity for maintaining the car in electrical contact with the energizing strips used in the prior art arrangements.

In the embodiment of the invention to be described, a pulse code is used with several variations, as will be described. Analog control signals from the individual manually controlled controllers are transformed into binary coded digital words of a selected length, which length can be changed depending upon the application. In a typical installation, each word contains four commands for each car and may, for example, contain a total of eight commands for independently controlling two cars.

Each car in the embodiment to be described is equipped with a first electric motor which controls one front wheel and a second electric motor which controls the other front wheel, as described in the copending application referred to above. The four commands for each car are "forward right motor", "reverse right motor", "forward left motor", and "reverse left motor". Such commands are all that are necessary in order to drive the car forward or reverse at varying controlled speeds, and to steer the car. Each command is represented by a binary digit which causes the designated motor to become energized when the corresponding bit is a "1", and which causes the designated motor to become de-energized when the corresponding bit is a "0".

Steering is accomplished by causing the motors to be energized and de-energized at different rates as successive bits are controlled to be "1's" or "0's" in successive words of the control signal; and speed control is achieved by controlling the rate at which the motors are energized by energizing and de-energizing both motors at the same rate but by varying the rate by varying the number of "1's" and "0's" in successive words of the control signal. It is clear that as successive words of the control signal includes fewer and fewer "1's", the motors will be driven at slower and slower speeds.

In the system to be described, a binary "0" is detected by the receiver by the receipt of 2-5 successive pulses in a particular bit with no more than two successive pulses missing; and a binary "1" is detected by the receipt of 6-13 successive pulses in a particular bit with no more than two successive pulses missing. Each word of the control signal is preceded by a synchronizing bit which is detected by the receipt of 14, or more, successive pulses with no more than two successive pulses missing. Such a format renders the system of the invention virtually immune from noise interference, and obviates the need for external adjustments at the transmitter or receiver, and usual component tolerances can be used. All timing within the system of the invention is based on a reference clock signal which may have a frequency, for example, of 50 KHz. The system to be described has a 16 bit resolution/channel, and a 10 Hz up-date (refresh cycle).

A feature of the embodiment of the invention to be described is the manner in which identical transmitters can be hooked together to double the number of cars which can be independently controlled.

The complexity of the encoder integrated circuit in the transmitter of the system is due largely to the logic required to convert the analog inputs from the controllers into appropriate digital control signals. Accordingly, for most purposes, two-car control systems are appropriate. Then, if more than two cars are to be controlled, a second identical transmitter may be connected to the first transmitter and its integrated circuit used to convert the analog signals from two additional controllers into the digital control signals, with the first integrated circuit being used to separate the digital control signals from its two controllers and the digital control signals from the additional two controllers into four distinct control channels for operating four separate cars. This approach is more advantageous than building the capability of responding to four controllers for controlling four separate cars into the original integrated circuit with the resulting added complexity and cost, where under most circumstances, the provision of two controllers to control two cars is sufficient.

Specifically, the analog-digital control logic in each integrated circuit in each transmitter has the ability to convert the analog control signals from its two controllers into the first eight bits of a 16 bit word and also into the last eight bits of the 16 bit word. However, the remaining circuitry in the integrated circuit transmits only the first eight bits over two of the four allocated channels to the receivers in the two controlled cars, the remaining eight bits being transmitted in the other two channels as "0's". However, if two transmitters are connected together, the circuitry in the integrated circuit of the first transmitter will respond to the last eight bits of each 16 bit word from the analog-digital conversion logic of the second transmitter to transmit control signals from two additional controllers for an additional two cars in the other two channels.

Therefore, in the embodiment of the invention to be described, two independent systems can be combined with no additional hardware, using the components of each, to double the number of cars that may be controlled.

It should be understood that although the control system of the invention will be described in conjunction with the capacitive control of toy racing cars, the control system has wide applications in the transmission of commands to one or more controlled instrumentalities, of any appropriate type, with a high degree of noise immunity. The system of the invention may also be adapted to ultrasonic, infrared, and other types of energy. Also, the system of the invention is compatible with radio frequency control system since, if so desired, the transmitter outputs may be modulated on radio frequency carriers and transmitted by a radio link.

BRIEF DESCRIPTION OF THE DRAWINGS

FIG. 1 is a schematic diagram of a system which may embody the concepts of the present invention;

FIG. 2 is a cross-sectional view of a track shown in FIG. 1, taken along the line 2—2, and illustrating a vehicle on the track;

FIG. 3 is a block diagram showing the manner in which the transmitter in FIG. 1 is capacitively coupled to a receiver in the vehicle of FIG. 2;

FIG. 4 is a schematic diagram of the transmitter portion of the system of FIG. 3;

FIG. 6 is a diagram showing the format of the signal transmitted by the transmitter to the receiver in the system of the invention in one of its embodiments;

DETAILED DESCRIPTION OF THE ILLUSTRATED EMBODIMENT

Figure 5:
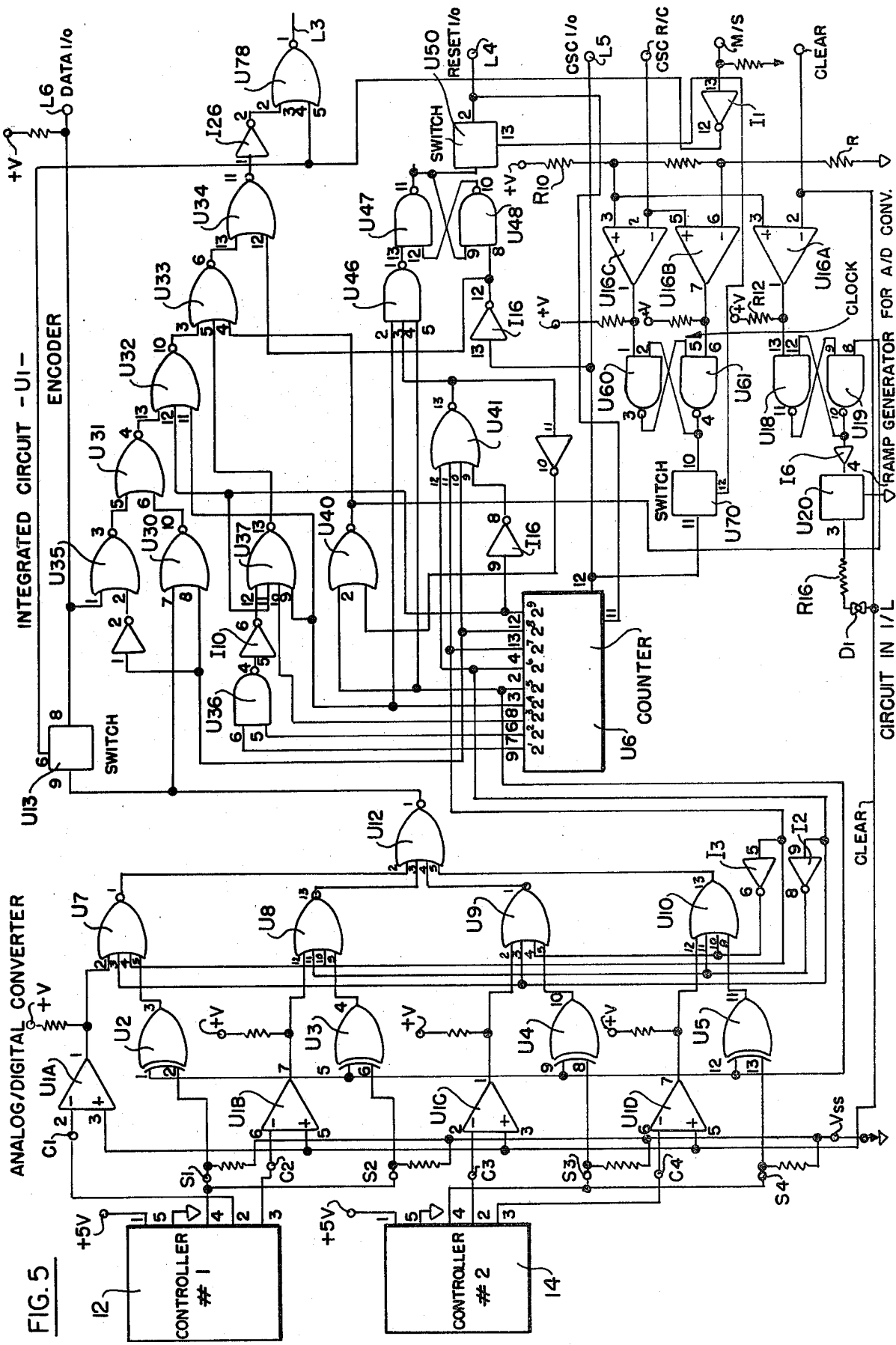
FIG. 5 is a logic diagram of an integrated circuit which is included in the transmitter of FIG. 4.

The system, as shown in FIG. 1 includes a transmitter 10 which is controlled by two manually operable controllers 12 and 14 to control two cars on a track 16 independently of one another. The transmitter includes two leads designated A and B, one of which is connected to a conductive coating 20 (FIG. 2) which extends around the track under the surface thereof to form a first capacitor plate, and a second of which is connected to a second capacitor plate which extends as a conductor 22 around the track, as shown in FIG. 1. A vehicle 26 is controlled by the transmitter at varying speeds in the forward or reverse direction, and may be steered, as the vehicle is propelled around the track. A second vehicle, not shown, is independently controlled by the transmitter, the first vehicle being under the control of controller 12 and the second vehicle being under the control of controller 14.

As shown in FIG. 2, the vehicle 26 has a conductive plate 28 mounted on its underside which constitutes a capacitor plate, and the vehicle may also be equipped with an antenna 30 which serves as a second capacitor plate on the vehicle. The capacitor plates 28 and 30, as shown in the equivalent electric diagram of FIG. 3, are connected to a receiver 32 in the vehicle, and the leads A and B, as also shown in FIG. 3 are connected to the capacitor plate formed by conductive coating 20 and to the capacitor plate formed by conductor 22. It will be appreciated that control signals transmitted by the transmitter over leads A and B will be capacitively coupled to the receiving circuitry of receiver 32 in the vehicle by the capacitive coupling between capacitor plates 20–28 and plates 22–30.

Conductor 22 may be omitted if connection or coupling to earth ground is achieved. In the illustrated embodiment the conductor forms an artificial "ground".

The transmitter 10, as shown in FIG. 4, includes an integrated circuit U1 which is shown in greater detail in FIG. 5. Controller 12, as shown in FIG. 4 is made up of two potentiometers RA and RB and a forward/reverse switch SW1. Further details of the controller will be described in conjunction with FIGS. 7, 8 and 9. The potentiometers RA and RB are manually controlled, and when the potentiometers are varied by the same amount, the speed of the vehicle 26 is varied, either in the forward or reverse direction, depending upon the position of switch SW1. When the potentiometers are varied differentially with respect to one another, the vehicle may be turned to the left or to the right, as will be described. Controller 14 has similar circuitry to controller 12.

The controllers 12 and 14 are connected to input pins of integrated circuit U1 designated S1, S2, C1, C2, and S3, S4, C3, C4. Pin designated VSS is connected to the negative terminal of a 9-volt battery B1, and pin VDD is connected to a lead L1 to be connected to the positive terminal of the battery so as to energize the circuit by way of lead L2 when the leads are plugged into a connector C-1 on the track 16. The leads L1 and L2, together with further leads L7, L3 and L8 are connected to the circuit of the track when the leads are connected to the connector on track 16.

Leads L4, L5 and L6 are used only when the output leads are connected to a second transmitter, as described above, so that four cars, rather than two may be controlled. When the leads are connected to the connector C-1 on track 16, the +V lead L1 is connected to battery lead L2, so that the circuit is energized immediately without the need for a switch. Also, lead L7 is then connected to leads L1 and L2, so that lead L7 is energized and term M/S goes high to indicate that the particular transmitter of FIGS. 4 and 5 is the master transmitter. The connector C-1 connects lead L3 to the conductor 22 as lead B in FIG. 1; also connects lead L8 to the second connector 20 in FIG. 1 as lead A.

When a second like transmitter is plugged into a connector C-2, its master/slave lead L7 is de-energized to indicate to the second transmitter that it is the slave. However, its outputs on leads L4, L5 and L6 designated respectively RESET I/O, OSC I/O and DATA I/O are introduced into the integrated circuit U1 of the transmitter of FIG. 4 to be processed by that transmitter. The circuitry of the other transmitter is energized by its connection to lead L1 which comes energized when connector C1 is plugged into the track.

The output of integrated circuit U1, appearing at output terminal designated "out" is introduced to the base of an NPN transistor Q1 through a 4.7 kilo-ohm resistor R3. The emitter of the transistor is connected back to the negative terminal of a 9-volt battery B1, and its collector is connected to one side of the primary winding of a transformer T1 through a 100 ohm resistor R2. The other side of the primary winding is connected to the (+V) lead L1. The secondary winding of transformer T1 is connected back to the primary winding as shown, and the other side of the secondary winding is connected to output line L3, whereas the negative terminal of battery B1 is connected to output line L8. The output lines L3 and L8 are shunted by a resistor R3. The (+V) lead L1 is also connected back to the controllers 12 and 14, as shown, and to an input terminal designated $V_{DD}$ of integrated circuit U1. The integrated circuit also has an input terminal designated $V_{SS}$ which is connected to the negative terminal of battery B1. The CLEAR input of the integrated circuit is connected to the +V lead through a 560 kilo-ohm resistor R2, and to a 0.15 microfarad capacitor C2, the capacitor being connected back to the negative terminal of battery B1.

The leads L4, L5 and are connected to respective input terminals of integrated circuit U1, as is the M/S lead L7. Lead L5 is also connected through a 75 kilo-ohm resistor R1 which is connected to a pin designated R/C of integrated circuit U1 and to a 150 picofarad capacitor C1, the capacitor being connected back to the negative terminal of battery B1, to control the clock frequency.

The leads L4, L5 and L6 from the connector C-2 supply the data from a second like transmitter to integrated circuit U1, so that the data from the two controllers of the like transmitter may be processed by the integrated circuit U1 and transmitted to the track 16, together with the data generated by the controllers 12 and 14. The circuit of resistor R2 and capacitor C2 provides a "CLEAR" signal to the integrated circuit when the connector C1 is plugged into the connector on track 16 for purposes to be described.

As mentioned above, the integrated circuit U1 is shown in logic detail in FIG. 5. The circuit of FIG. 5 is made up of two sections indicated "analog/digital converter" and "encoder". As shown in FIG. 5, pins C1 and C2 of the integrated circuit are connected to the negative inputs of respective comparators U1A and U1B, and pins C3 and C4 are connected to the negative inputs of respective comparators U1C and U1D. The comparators may be of the type designated 393UA. The positive inputs of the comparators are connected to the CLEAR pin of the integrated circuit.

Input pin S of the integrated circuit is connected to an exclusive "or" gate U2, and pins S2, S3 and S4 are connected respectively to exclusive "or" gates U3, U4 and U5. The exclusive "or" gates may be of the type designated 4070. The other inputs of the exclusive "or" gates U2, U3, U4 and U5 are connected to one of the outputs of a counter U6. Counter U6 is a nine stage counter in the illustrated embodiment, and may be an integrated circuit of the type designated 4090. The exclusive "or" gates are connected to output terminal 3 of the counter which is designated $2^5$.

The output of comparator U1A and exclusive "or" gate U2 are introduced to a "nor" gate U7, the outputs of comparator U1B and exclusive "or" gate U3 are applied to a "nor" gate U8, the outputs of comparator U1C and exclusive "or" gate U4 are applied to a "nor" gate U8, and the outputs of comparator U1D and exclusive "or" gate U5 are applied to a "nor" gate U9. The "nor" gates may be of the type designated 4002.

The outputs of the "nor" gates U7, U8, U9 and U10 are all connected to a "nor" gate U12 which also may be of the type designated 4002. The output of "nor" gate U12 is passed through a switch U13 to the data I/O pin of the integrated circuit U1. Switch U13 may be a solid state switch of the type designated 4066. The switch is open when M/S is high to enable the particular transmitter to function as a master transmitter when it is connected to a slave transmitter. The M/S signal received by the circuit is fed through an inverter I1 to the switch U13, so than when M/S is high, the switch is open. The slave transmitter M/S is low and switch U13 is closed, so that the data from the analog-digital converter portion of the circuit of the slave transmitter may be passed to the master transmitter by way of the data I/O lead L6.

The "nor" gates U7 and U9 are connected to pin 2 of counter U6 which is designated $2^6$. This pin is connected through an inverter I2 to "nor" gates U8 and U10. Likewise, "nor" gates U7 and U8 are connected to pin 4 of counter U6, which is designated $2^7$, and that pin is also connected through an inverter I3 to "nor" gates U9 and U10. Inverters I2 and I3 may be of the type designated 74C14, as may inverter I1.

The CLEAR signal received by the integrated circuit U1 is applied to the negative input of a comparator U16A which, together with comparators U16B and U16C may be of the type designated 4090. The positive output of comparator U16A is connected to the +V lead through a resistor R10. The output of the comparator is connected to the +V lead through a resistor R12, and to the input of a ramp generator. The ramp generator is made up of a pair of "nand" gates U18 and U19 which may be of the type designated 4011. The output of the ramp generator is connected through a switch U20 of the type designated 4066 through an inverter I6, switch U20 being connected to the CLEAR line through a resistor R16 and through a double diode D1.

It will be recalled from the description of the circuit of FIG. 4 that the CLEAR terminal is connected to an RC network made up of resistor R2 and capacitor C2. As the voltage +V is applied to capacitor C2, a ramp is applied by the CLEAR line to the comparators U1A, U1B, U1C and U1D, and when the ramp reaches a predetermined level, the circuit U18, U19 closes switch U12 to connect the CLEAR lead to the negative terminal of battery B1 and discharge capacitor C2, at which time the ramp recommences. The successive ramp signals define the refresh intervals and may occur, for example, at a rate of 10 Hz.

During any ramp interval, the output of the corresponding comparators U1A, U1B, U1C and U1D will be low so long as the ramp voltage is less than the particular analog voltage applied to the respective comparators by the controllers 12 and 14. However, at a certain time, depending upon the amplitude of the respective analog voltages, the comparator output will go high. Therefore, at certain times the outputs of the comparators will be high, depending upon the setting of the wipers in the various controllers, and at other times the outputs will be low.

The respective outputs are multiplexed in the analog/digital converter circuit, and the multiplexed signals are passed through the "nor" gate U12 to the encoder section of the transmitter, which will now be described. The output from the "nor" gate U12 is passed to a "nor" gate U30 in the decoder section which, in turn, is connected to a "nor" gate U31. The "nor" gate U31 is connected to a "nor" gate U32 which in turn is connected to a "nor" gate U33, the "nor" gate U33 being connected to a "nor" gate U34. The "nor" gates U30, U31 and U34 may be of the type designated 4001, whereas the "nor" gates U32 and U33 may be of the type designated 4025.

When switch U13 is closed, the data from "nor" gate U12 is transmitted over the data I/O line to the other like transmitter for processing, and is not processed in the decoder of FIG. 5. On the other hand, when the switch U13 is open, data from the analog-digital converter section of the other transmitter may be processed in the encoder section of the circuit of FIG. 5, such data being received over the data I/O line and applied to a "nor" gate U35 which may be of the type designated 4001.

A "nand" gate U36 is connected to the terminals 7 and 9 of counter U6 which are designated $2^1$ and $2^2$. This "nand" gate may be of the type designated 4011, and it is connected through an inverter I10 of the type designated 74C14 to a "nor" gate U37 of the type designated 4002. "Nor" gate U37 is connected to "nor" gate U33. Terminal 12 of counter U6 which is designated $2^9$ is connected to "nor" gate U37 and to "nor" gate U32. Terminal 6 of counter U6 which is designated $2^3$ is also connected to "nor" gate U37. Terminal 3 of counter U6 which is designated $2^5$ is connected to a "nor" gate U40 which may be of the type designated 4025, and the "nor" gate U40 is connected to "nor" gate U33. Terminals 2, 4 and 13 of counter U6 are connected to a "nor" gate U41 which may be of the type designated 4001, and terminal 12 of the counter is coupled through an inverter I16 to "nor" gate U41.

"Nor" gate U41 is connected to a "nand" gate U46 of the type designated 4012, and terminals 3 and 8 of counter U6 are also connected to the "nand" gate. The output of the "nand" gate is connected to a flip-flop made up of "nand" gates U47 and U48 which, like "nand" U46 may be of the type designated 4012. The flip-flop is connected through a switch U50 which may be a solid state switch of the type designated 4066 to the reset I/O lead L4 of FIG. 4. Switch U50 is controlled by the M/S signal on lead L7.

The encoder section of the circuit in FIG. 5 includes a clock generator which is formed of a pair of "nand" gates U60 and U61 which may be of the type designated 4011. The comparators U16B and U16C are connected to the clock circuit, the negative input of comparator U16C and the positive input of comparator U16B being connected to the OSC R/C pin of integrated circuit U1 in FIG. 4. The OSC I/O pin of integrated circuit U1 in FIG. 4 is connected to the clock input CL of counter U6, and through an inverter I16 to flip-flop U47, U48. The output of clock generator U60, U61 is connected through a solid state switch U70 to the CL input of counter U6 to supply, for example, a 50 KHz clock to the counter. Switch U50 which is controlled by the M/S signal, as is switch U70, is connected to the reset I/O lead L4 of FIG. 4.

When the encoder section of the circuit of FIG. 5 is operational, M/S is high so that the output of its clock U60, U61 is passed to the counter U6 through switch U70 to operate the counter. Also, switch U50 is closed, so that flip-flop U47, U48 resets the counter of the encoder section in the other transmitter. Under such conditions, the encoder section of the circuit of FIG. 5 is active, and the encoder of the other transmitter, which is the slave transmitter is inactive. Under such conditions, the encoder section of the circuit of FIG. 5 encodes not only the signals received from its analog/digital converter, but also the signals received from the analog/digital converter of the other transmitter which are received on the data I/O lead L6. When the decoder of FIG. 5 is active, its clock generator U60, U61 is timed by the RC network R1, C1 of FIG. 4.

"Nor" gate U34 is connected through an inverter I26 to a "nor" gate U78, and the output of inverter I1 is also applied to the "nor" gate U78. The output from the encoder section of the circuit of FIG. 5 appears on the lead L3 at the output of "nor" gate U78. An output appears at the output of "nor" gate U78 only when the term M/S is high indicating that the transmitter of FIG. 5 is the master transmitter, and its encoder is active.

The encoder described above, when active, serves to establish the signals into four channels, as shown in FIG. 6. The first two channels in FIG. 6 represent signals from the controllers 12 and 14 respectively, and the third and fourth channels represent signals from the additional controllers associated with the slave transmitter. If only one transmitter is used, switch U13 is closed and the encoder transmits signals from controllers 12 and 14 in channels 1 and 2 and transmits zeros in channels 3 and 4.

As illustrated in FIG. 6, each successive word of the control signal is preceded by a synchronizing bit composed, for example, of 16 or more pulses. In each channel, four bits of information are transmitted representing, for example, four commands to the controlled vehicle. These commands may be, for example, "forward on left motor", "reverse on left motor", "forward on right motor" and "reverse on right motor", as explained above. Whenever a corresponding bit is a "1", the corresponding motor is energized and it remains energized until the corresponding bit is a "0", at which time the motor becomes de-energized. As described above, each "0" bit is made up, for example, of four pulses, and each "1" bit is made up, for example, of eight pulses. Therefore, the command in the main channel 1 is to energize the left and right motors in the forward direction, the command in channel 2 is to energize the right motor in the reverse direction, the command in channel 3 is to energize the left motor in the reverse direction, and the command in channel 4 is to energize the left motor in the forward direction and to energize the right motor in the reverse direction.

As stated above, the ramp signal generator U18, U19 generates ramp signals for the controllers at a 10 Hz rate. For each ramp cycle, a multiplicity of words of the type shown in FIG. 6, are transmitted. In each controller, the potentiometer RA of FIG. 4, for example, controls the left motor, and the potentiometer RB, for example, controls the right motor. If both these potentiometers are placed in the zero voltage condition, then throughout each ramp cycle, all the bits of the resulting successive words in the corresponding channel will be zero. However, if either of the potentiometers is moved from the zero position, although the corresponding bits in the initial words may be zero at the beginning of the ramp cycle, the bits will change to a "1" at some point in the ramp cycle. The point in the ramp cycle at which the bits change to a "1" depend upon how far the wiper of the corresponding potentiometer is moved from its zero position. If the wiper is moved to its maximum position, the corresponding bits become "1's" at the beginning of the ramp cycle, and remain "1's" throughout the ramp cycle.

Therefore, if both potentiometers RA, RB are set at the zero position, the car controlled by them will remain stopped. Then, if the wipers of both potentiometers are moved together from the zero position, the car will start, and will move at a speed corresponding to the settings of the two potentiometers, for those settings determine how many "1" bits will occur in each ramp cycle which, in turn, determines how long the motors will be energized during each ramp cycle which in turn determines the speed of the vehicle. Also, and as explained above, if the wipers are moved differentially from the zero positions, one of the motors is energized at a greater rate than the other, so that the car may be turned to the left or to the right.

In the encoder section of the circuit of FIG. 5, the 16 pulse synchronizing bit is formed by the "nor" gate U40, and the three pulse zero bits are formed by the "nor" gate U37. The eight pulse "1" bits are formed by the "nor" gate U32, and these are combined with zero bits from "nor" gate U37 and the synchronizing signals from "nor" gate U40 in "nor" gate U33. Then, if the transmitter is the master transmitter, the resulting bits are passed by "nor" gate U34 and "nor" gate U78 to the data line L3. Otherwise, the "nor" gates U34 and U78 prevent any transmission from the decoder.

Figure 9:
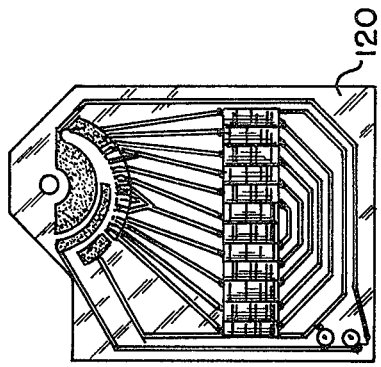
FIG. 9 is a view of a circuit board which is mounted within the controller, taken along the lines 9—9 of FIG. 8.
Figure 8:
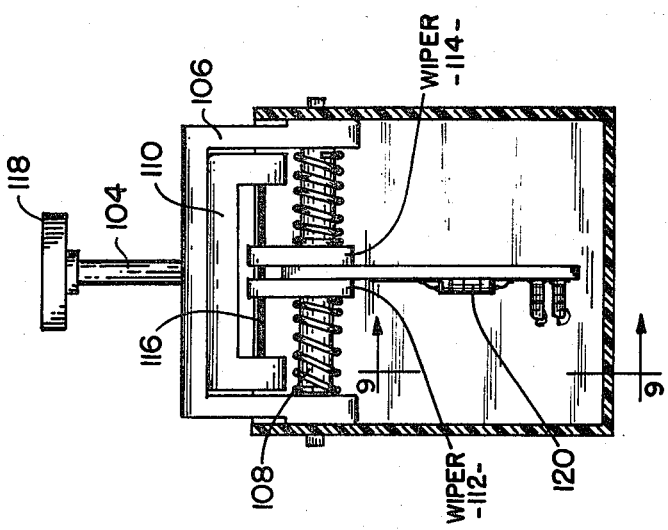
FIG. 8 is an elevational view of the controller with the cover removed, and with the housing shown in section, to reveal the internal components.
Figure 7:
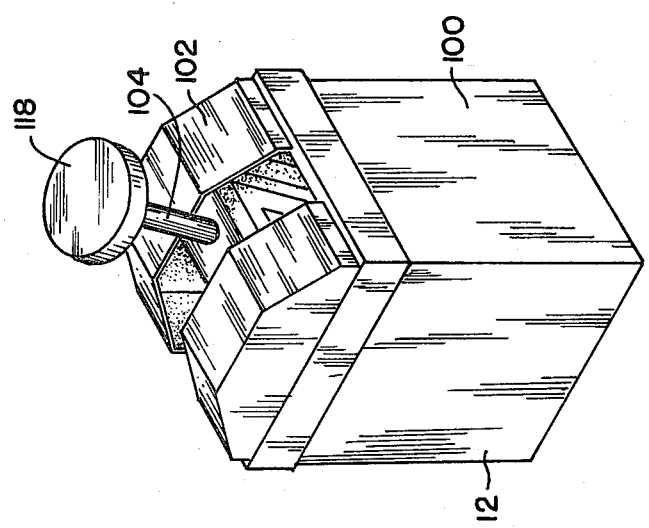
FIG. 7 is a perspective representation of the mechanical details of a controller used in the system.

One physical embodiment of the controller 12 is shown in FIGS. 7, 8 and 9. It will be understood that the other controllers may be similarly constructed.

The controller 12 has a housing 100 which, in turn, has a cover 102. A control post 104 is mounted on a yoke 106 which, in turn, is pivotally mounted on a shaft 108. The post 104 extends through the yoke 106 to a second yoke 110 which supports a pair of wipers 112 and 114 on a pin 116. A knob 118 is mounted at the top of post 104. The potentiometer elements are supported on a printed circuit 120, shown in FIG. 9, and take the form of a plurality of fixed resistors which are switched successively into the circuit as the wiper 114 moves across the contacts at the upper edge of the printed circuit. An identical printed circuit is mounted on the other side of the circuit board to be contacted by wiper 112.

When the post 104 is moved by handle 118 pivotally about the shaft 108, both wipers 112 and 114 move across the printed circuit contacts in unison, so that equal amounts of resistance are successively switched into the circuit. However, when the post 104 is turned about its longitudinal axis by knob 118, yoke 110 turns the pin 116, and causes the wipers 112 and 114 to move differentially across the contacts on their printed circuit boards.

Therefore, the speed of the controlled vehicle may be varied by turning post 104 about the axis of shaft 108, and the controlled vehicle may be steered by turning the shaft 104 about its longitudinal axis.

Figure 10:
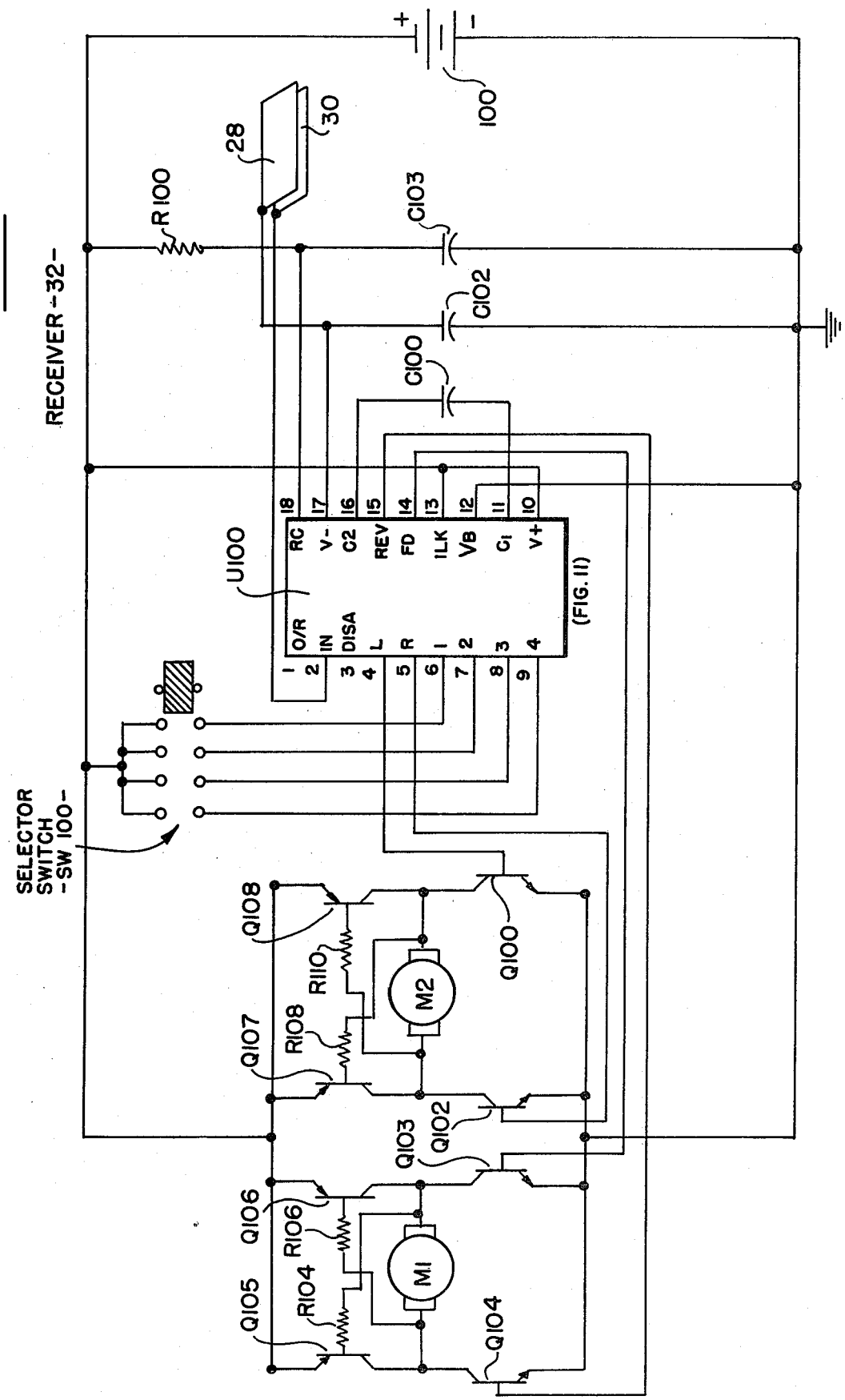
FIG. 10 is a schematic diagram of the receiver of FIG. 3.
Figure 11:
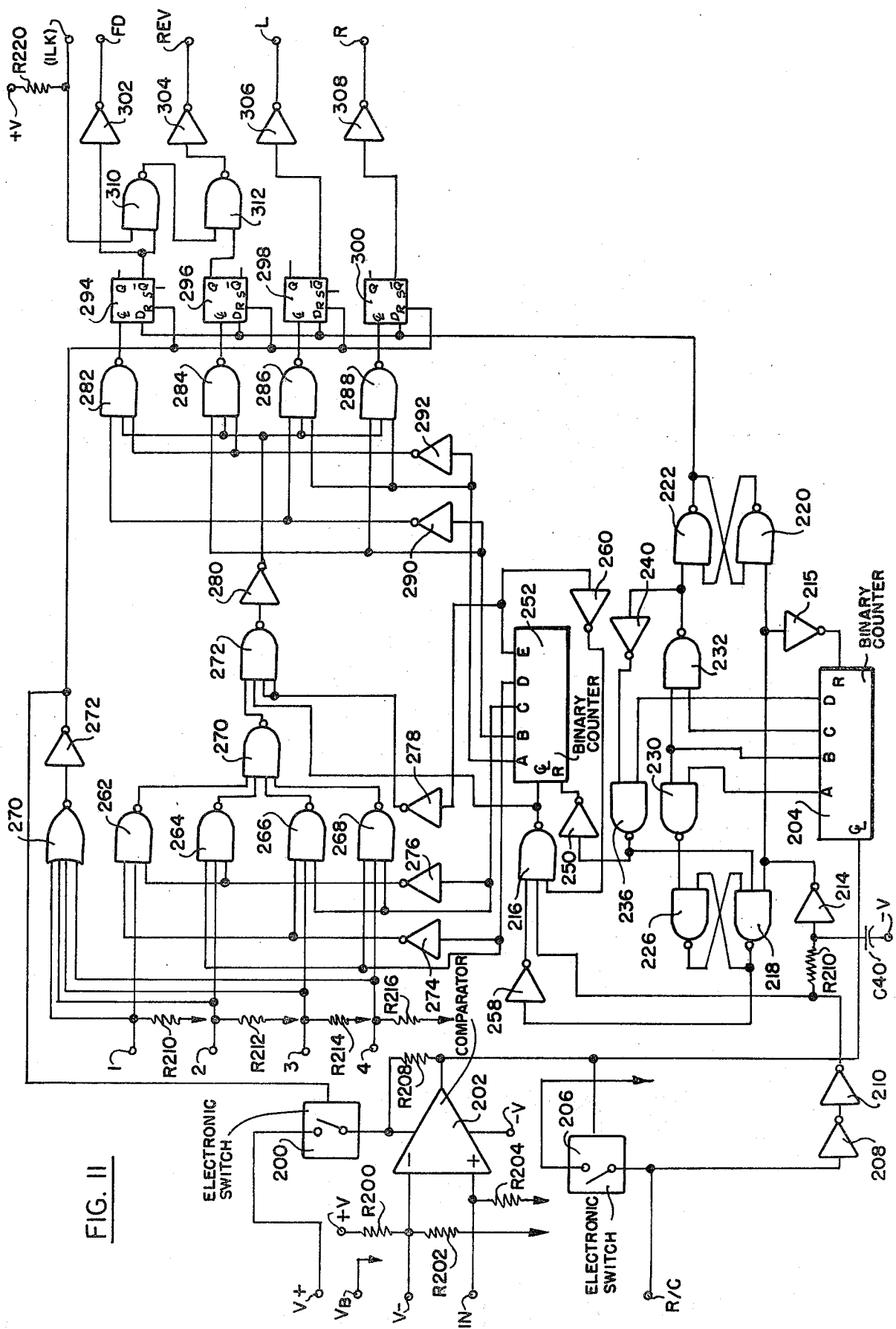
FIG. 11 is a logic diagram of an integrated circuit which is included in the receiver of FIG. 10.

The receiver 32, as shown in FIG. 10, includes an integrated circuit U100 which is described in logic detail in FIG. 11. The capacitor plates 28 and 30 of FIGS. 2 and 3 are connected to pins designated V− and IN of the integrated circuit U100. Pin V− is also connected to a grounded capacitor C102 which has a capacity of 0.1 microfarads. Capacitor C102, together with a 0.01 microfarad capacitor C100 constitute a voltage doubling circuit for the integrated circuit U100 in accordance with known techniques. Capacitor C100, as shown, is connected to pins C1 and C2 of the integrated circuit. Pin V+ of the integrated circuit, together with a pin ILK, are connected to the positive terminal of a unidirectional voltage source 100. The voltage source 100 may be a battery of a rating of 2.0–2.4 volts. The negative terminal of the voltage source 100 is grounded, as is pin $V_B$ of the integrated circuit. A capacitor C103 is connected to ground, and through a resistor R100 to the positive terminal of the voltage source 100. The junction of resistor R100 and capacitor C103 is connected to a pin designated RC of integrated circuit U100. The capacitor C103 and resistor R100 constitute an RC timer for the receiver.

The receiver also includes a selector switch SW100 which may be set to any one of four positions, to condition the receiver to accept any one of the four channels of FIG. 6. One set of terminals of the selector switch is connected to the positive terminal of voltage source 100, and the other terminals are connected respectively to pins designated 1, 2, 3 and 4 of the integrated circuit.

A pin L of the integrated circuit is connected to the base of an NPN transistor Q100, and a pin designated R is connected to the base of an NPN transistor Q102. A pin designated FD of the integrated circuit is connected to the base of an NPN transistor Q103, and a pin designated REV of the integrated circuit is connected to the base of an NPN transistor Q104.

The receiver is connected to a motor M1 which drives the left wheel of the vehicle, and to a motor M2 which drives the right wheel of the vehicle. The transistors Q100–Q104, together with additional NPN transistors Q105, Q106, Q107 and Q108 are connected to the motors M1 and M2 through resistors R104, R106, R108 and R110. The emitters of transistors Q100–Q104 are grounded, and the emitters of transistors Q105–Q108 are connected to the positive terminal of source 100.

The circuitry associated with the motors M1 and M2 is such that when the voltage at pin L of integrated circuit U1 goes high, the left motor is operated, and when the voltage at pin R goes high the right motor is operated. Then, the selected motor is driven either in the forward direction or the reverse direction depending upon whether the voltage at pin FD goes high or the voltage of pin REV goes high.

As shown in the logic circuit of FIG. 11, pin V+ of the integrated circuit U-100 is connected to one terminal of an electronic switch 200, which may be of the type designated 4066. A second terminal of electronic switch 200 is connected to a comparator 202, which may be of the type designated LM393 to energize the comparator when the switch is closed. Pin V− is connected to the junction of a pair of resistors R200 and R202 which are connected between the positive terminal of the voltage source 100 and ground. Pin V− is also connected to the minus input of comparator 202. Pin IN is connected to the positive input of comparator 202 and to a grounded 1 megohm resistor R204. The output pin of the comparator is connected to electronic switch 200 through a 10 kilo-ohm resistor R208.

The signal pulses of FIG. 6 received across the capacitor plates 28 and 30 of FIG. 10 are applied to the comparator 202 of FIG. 11, and so long as these pulses exceed a predetermined minimum threshold, and when the comparator is energized by electronic switch 200, the pulses are passed to the output of the comparator, and are used to clock a four-bit binary counter 204 which may be of the type designated 4040.

The pin R/C of integrated circuit U-100, which is connected to the RC timer R100/C103 of FIG. 10, also connects with an electronic switch 206 which likewise may be of the type designated 4066. The other terminal of electronic switch 206 is grounded, and the switch is controlled by the pulses appearing at the output of comparator 202. Each pulse produced at the output of comparator 202 closes switch 206 which discharges capacitor C103 of FIG. 10. Therefore, so long as the synchronizing pulses and signal pulses of FIG. 6 are being received, the capacitor C103 is discharged. This enables the pulses to be fed to the counter 204, and so that the counter can operate the logic circuitry associated with it. However, in intervals between the signal pulses and the synchronizing pulses, the capacitor C103 is charged, and the resulting voltage appearing at the R/C pin operates a Schmitt trigger formed of circuits 208 and 210 which may be of the type designated 74C14 and 4049 respectively.

The circuits 208, 210 act as a comparator, so that when the charge on capacitor C103 rises to a particular level, an output is developed which disables a "nand" gate 216 which may be of the type designated 4023. The output of the comparator is also introduced through a resistor R210 and an inverter 214 to "nand" gate 218 and "nand" gate 220. The resistor R210 is also connected to a capacitor C210 which, in turn, is connected to the V-terminal. "Nand" gate 210 may be of the type designated 4023, and "nand" gate 220 may be of the type designated 4011.

"Nand" gate 220, and a like "nand" gate 222 are connected as a latch circuit, and "nand" gate 218 and a "nand" gate 226 are also connected as a latch circuit. "Nand" gate 226 may be of the type designated 4011. The comparator 208, 210 causes both the latch circuits to be disabled in the presence of noise signals, and causes the latch circuits and "nand" gate 216 to be enabled only when the synchronizing pulses or signal pulses of FIG. 6 are received. The circuit R210 and C210 provides a delay in the control of the latching circuits by the input of the comparator 208, 210.

The binary counter 204 counts the individual synchronizing and signal pulses of FIG. 6. When four or more pulses are received, indicating either a synchronizing bit, a "1" or a "0", both outputs A and B of the binary counter 204 go high, enabling the "nand" gate 230, and causing latch 226 to set. When eight or more pulses are received, indicating a "1" or a synchronizing bit, outputs B and C of the binary counter go high, enabling a "nand" gate 232, and setting the latch 220, 222. When more than eight pulses are received, indicating a synchronizing bit, output D of the binary counter 204 goes high. This latter terminal of the binary counter is connected to a "nand" gate 236, and the output of "nand" gate 232 is connected through an inverter 240 to "nand" gate 236, so that when a sync pulse is received, "nand" gate 236 is enabled. "Nand" gates 230, 232 and 236 may be of the type designated 4011. Inverter 240 may be of the type designated 4049.

The synchronizing bit output of "nand" gate 236 is introduced through an inverter 250 to a 5-bit binary counter 252. The binary counter 252 may be of the type designated 4040, and it counts each group of signals received between synchronizing bits, as shown in FIG. 6. To that end, the counter 252 is reset by the synchronizing bit output of "nand" gate 236 each time a synchronizing bit is received, and the counter 252 is advanced each time a signal group in FIG. 6 is received, this being achieved by the setting of latch 218, 226 which occurs for each signal group, regardless of whether a "0" or a "1" is designated. The output of latch 218, 226 is introduced through an inverter 258 and through "nand" gate 216 to the counter 252. Inverter 258 may be of the type designated 47C19.

Termainl E of the counter is connected back to "nand" gate 216 through an inverter 260 which may be of the type designated 4049. It will be appreciated that counter 252 is advanced only when the output of comparator 208, 210 is such that the receipt of actual signal pulses is indicated, rather than noise, and also under conditions that the counter has not been advanced to a point at which its output terminal E is high.

It is to be noted that the inverter 214 is also connected back to the reset pin of binary counter 204 through an inverter 215 may be of the type designated 74C19. This connection causes binary counter 204 to be reset under any condition in which less than three pulses are received in any particular group, since such a situation indicates that the received pulses represent neither a synchronizing bit nor signal groups.

Pins 1–4 of the integrated circuit chip U100 are connected to a decoding circuit made up of a group of "nand" gates 262, 264, 266 and 268, which may be of the type designated 4023. The pins 1–4 are also connected to a respective grounded 100 kilo-ohm resistors R210, R212, R214 and R216. The pins 1–4 are all connected to a "nor" gate 270 which, in turn, is connected to an inverter 272. The output of inverter 272 is connected back to electronic switch 200, so that the receiver circuit energizes itself when selector switch SW100 is set to any particular channel.

The outputs of the "nand" gates 262, 264, 266 and 268 are connected to a "nand" gate 270 which, in turn, is connected to a "nand" gate 272. "Nand" gates 270 and 272 may be of the type designated 4012. The output terminals C, D and E of the binary counter 252 are connected directly and through appropriate inverters 274, 276 and 278 to the aforesaid "nand" gates. The inverters being of the type designated 4049. The output of "nand" gate 272 is introduced through an inverter 280, which may be of the type designated 4049, to a further decoder circuit which includes "nand" gates 282, 284, 286 and 288, which may be of the type designated 4023. The outputs A and B of the counter 252 are connected to the latter "nand" gates directly, and through inverters 290 and 292, the inverters being of the type designated 4049.

The counter 252, by counting the signal groups, causes the decoding circuit of "nand" gates 262, 264, 266 and 268 to implement the decoding circuit of "nand" gates 282, 284, 286 and 288 at times corresponding to the receipt of the signals in any one of the channels 1, 2, 3 or 4 in FIG. 6, depending upon the setting of the selector switch SW100 in FIG. 10, which, in turn, determines which of the input pins 1, 2, 3 or 4 is high.

After the particular channel has been selected, counter 252 then causes the decoding circuit of "nand" gates 282, 284, 286 and 288 to respond to the individual signal groups in the selected channel. To this end, the "nand" gates are connected to respective flip-flops 294, 296, 298 and 300 which may be of the type designated 4013, and which act as storage registers. These flip-flops are conditioned by the latch 220, 222, and if any one of the flip-flops is conditioned at the time corresponding to a particular signal group, indicating a "1", the flip-flop is set at that particular time as it is clocked by the output of a corresponding one of "nand" gates 282, 284, 286 or 288.

The outputs of the flip-flops are introduced through respective inverters 302, 394, 306 and 308 to the respective output pins FD, REV, L and R. Therefore, so long as a "1" continues to be received for any particular command, its corresponding flip-flop 294, 296, 298 or 300 will remain set, and the corresponding output pin will remain high. However, should a "0" be received for that particular command, latch 220, 222 will not be set, and the corresponding flip-flop will be clocked to its reset position, so that the corresponding output pin FD, REV, L or R will go low. As explained above, speed in the forward or reverse direction may be controlled, simply by controlling the number of "1" commands transmitted to the particular vehicle for any control interval. A pair of "nand" gates 310 and 312 is included in the FD, REV circuit, and these may be of the type designated 4011. The "nand" gates are controlled by an interlock signal (ILK) applied to the ILK pin over a lead which is connected to the positive terminal of the voltage source through a 100 ohm resistor R220. This interlock signal is such to assure that both the FD and REV pins cannot go high together.

Also, the output of inverter 272 is also connected to the reset terminals of the flip-flops 294, 296, 298, 300, to assure that when the system is first turned on, all of the flip-flops will be reset.

In the manner described, therefore, the receiver circuit of FIGS. 10 and 11 responds to the signals to FIG. 6, so that each vehicle may be set to a different channel, and so that each vehicle will respond to the command received over its channel, to control the drive motors M1 and M2 in a manner such that the vehicle is driven forward or reverse at any desired speed, and is turned to the left and the right, as described.

It will be appreciated that while a particular embodiment of the invention has been shown and described, modifications may be made. It is intended in the claims to cover all the modifications which come within the true spirit and scope of the invention.

What is claimed is:

1. A remote control system for an instrumentality to be controlled comprising: a controller for producing at least one analog control signal; analog/digital converter circuitry connected to the controller for converting the analog control signal into digital control signals representing at least one command to be transmitted to the instrumentality; encoding circuitry connected to the analog/digital converter circuitry for processing the digital control signals from the analog/digital converter circuitry into successive words containing binary coded bits representative of said digital control signals; cyclic signal generating circuitry connected to said controller for introducing a cyclic signal to said controller to cause said encoding circuiry to produce a predetermined number of such successive words for each cycle of said signal with the binary value of the binary coded bits in the words generated during each of the cycles being dependent upon the value of said analog control signal; and means connected to the encoding circuit for transmitting the successive words to the instrumentality.

2. The remote control system defined in claim 1, in which said controller comprises first and second manually controlled potentiometer means.

3. The remote control system defined in claim 1, in which said encoding circuitry includes logic circuit means for producing said binary coded bits in the form of groups of pulses with a first number of pulses in each group designating the corresponding bit as being binary "0" and with a second number of pulses in each group designating the corresponding bit as binary "1".

4. The remote control system defined in claim 3, in which said encoding circuitry includes logic circuit means for producing a burst of pulses of a number different from the number of pulses designating binary "0" and binary "1" for each of said words to serve as a synchronizing signal.

5. The remote control system defined in claim 1, and which includes a receiver mounted in said instrumentality, and capacitive means coupling said transmitting means to said receiver.

6. The remote control system defined in claim 1, in which said encoding circuitry includes logic circuit means for separating the binary coded bits into a plurality of groups in each such word with each group constituting a separate channel to a different instrumentality.

7. The remote control system defined in claim 6, in which said encoding circuitry includes logic circuit means for connection to the analog/digital circuitry of a like control system for processing into selected ones of the channels the digital control signals received from the like control system.

8. The remote control system defined in claim 1, in which the instrumentality is a vehicle to be propelled around a track, and which includes a receiver mounted on the vehicle, first conductive means mounted on the track connected to the transmitting means, and second conductive means mounted on the vehicle connected to the receiver and capacitively coupled to the first conductive means.

9. The remote control system defined in claim 2, in which the controller comprises a casing, a shaft extending across the casing, a first yoke mounted on said shaft, a second yoke positioned within said first yoke, an operating post extending through the first yoke and secured to the second yoke; a pin extending across the second yoke in spaced relationship with the shaft; a pair of wipers mounted on said pin and on said shaft and extending therebetween adjacent to one another with the ends of the wipers protruding beyond the shaft; and an electric circuit board mounted in said casing to be engaged on opposite sides by the protruding ends of the wipers, so that when the first yoke is turned about the axis of the shaft by the operating post the protruding ends of the wipers are moved in unison with respect to the circuit board, and when the operating post is turned about its longitudinal axis the wipers are moved differentially with respect to the circuit board.

* * * * *